United States Patent [19]
Wright

[11] 3,858,906
[45] Jan. 7, 1975

[54] BICYCLE AND SEAT SUPPORT

[76] Inventor: Arthur D. Wright, Box 1555, Erie, Pa. 16507

[22] Filed: July 26, 1972

[21] Appl. No.: 275,189

[52] U.S. Cl.................. 280/283, 280/275, 280/289
[51] Int. Cl............................................. B62k 19/34
[58] Field of Search.......... 280/289, 281, 283, 275, 280/282; 297/195, 345; 248/407, 408, 423

[56] References Cited
UNITED STATES PATENTS

| 163,329 | 5/1875 | Reed | 248/423 X |
|---|---|---|---|
| 1,584,646 | 5/1926 | Radnall | 280/281 X |
| 1,668,784 | 5/1928 | Savage | 280/282 X |

FOREIGN PATENTS OR APPLICATIONS

| 18,254 | 4/1911 | Great Britain | 248/408 |

*Primary Examiner*—Stanley H. Tollberg
*Assistant Examiner*—Norman L. Stack, Jr.

[57] ABSTRACT

A bicycle and a seat support on the bicycle. The seat support is made up of an upwardly extending column fixed to the bicycle frame. The column is made of a resilient material, such as spring steel. A truss structure made of two spaced vertical members is fixed to the bicycle frame and may be a continuation of the rear fork of the bicycle. These truss members extend upwardly and are welded to the top part of the frame at its rear end, then are bent back on themselves in U-shape and the lower part of the truss members are welded to the upper part of the frame. The upper end of the column is supported at the upper part of the truss members. The column is made of a platelike member and has laterally disposed notches. A slider is supported around the column and the slider receives the rear end of the seat support. The seat support is made of a spring that is bent at right angles and extends forward parallel to the bicycle frame. The downwardly extending part of the seat support extends through the slider and urges the slider forward. There are detents on the inside of the slider adjacent its rear edge so when the slider is pushed backward, the detents will move out of the notches and the seat can be adjusted up and down. When the slider is pulled forward by the seat support, the detents engage the notches.

The front fork is supported ahead of the frame by a truss structure made up of two spaced members welded to each side of the frame and welded to a bearing member or fifth wheel at their front end. The lower leg of the U extends forward over the front wheel and forms a basket support. The upper ends of the U-shaped members are bent downward at a point behind the fifth wheel and the front ends are welded to the basket support. A reinforcing member in the form of an oval extends around the upper end of the U-shaped member and is attached to the fifth wheel.

14 Claims, 8 Drawing Figures

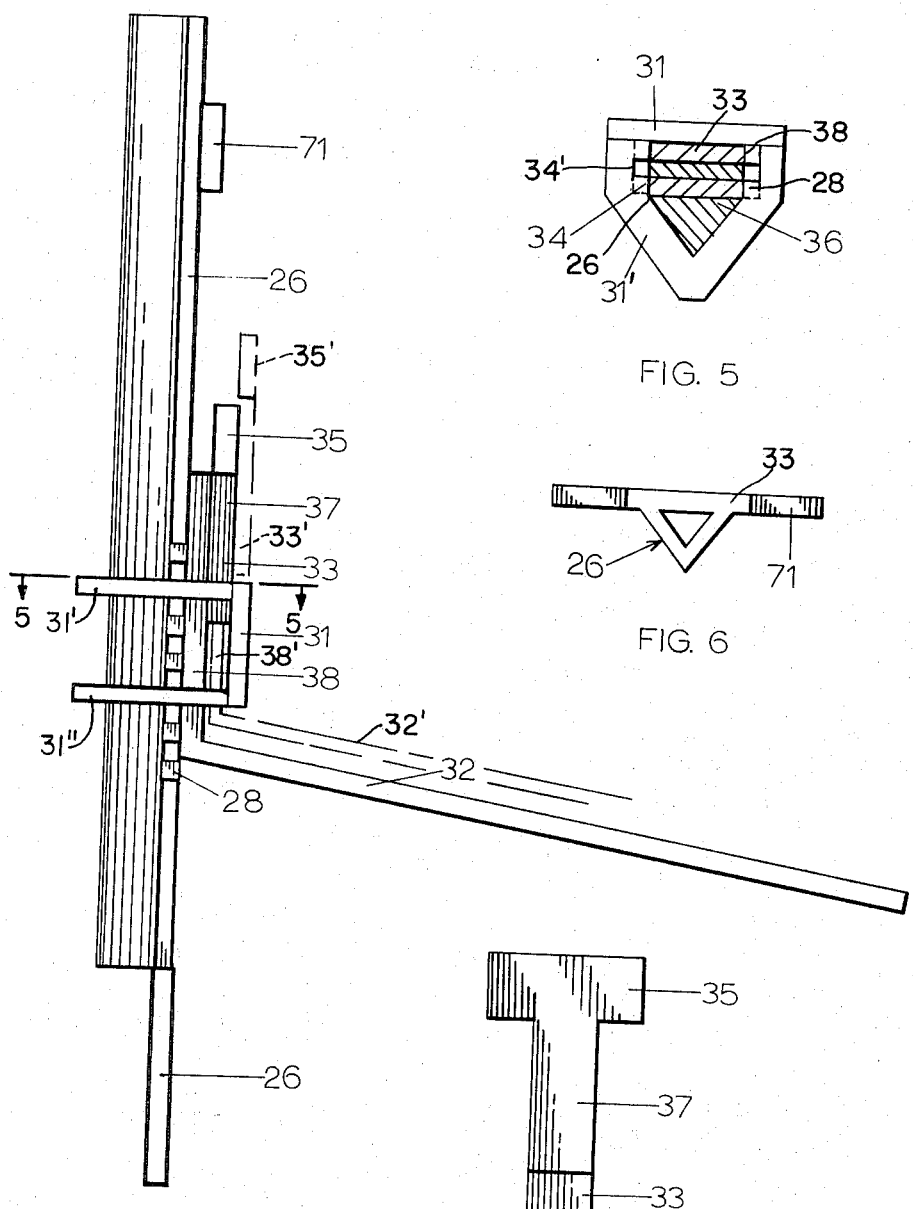

3,858,906

BICYCLE AND SEAT SUPPORT

OBJECTS OF THE INVENTION

It is an object of the invention to provide an improved bicycle.

Another object of the invention is to provide an improved seat support.

Another object of the invention is to provide an improved frame design for a bicycle.

Another object of the invention is to provide an improved front end design for a bicycle.

Another object of the invention is to provide an adjustable seat support that is simple in construction, economical to manufacture, and easy to use.

Another object of the invention is to provide an improved bicycle that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 4 is a side view of the seat support mechanism in a position halfway between fully locked and fully released for better understanding.

FIG. 5 is a cross sectional view of the slider taken on line 5—5 of FIG. 4.

FIG. 6 is a top view of the seat support column.

FIG. 7 is a front view of the seat support member.

DETAILED DESCRIPTION OF THE DRAWINGS

Figure 1:
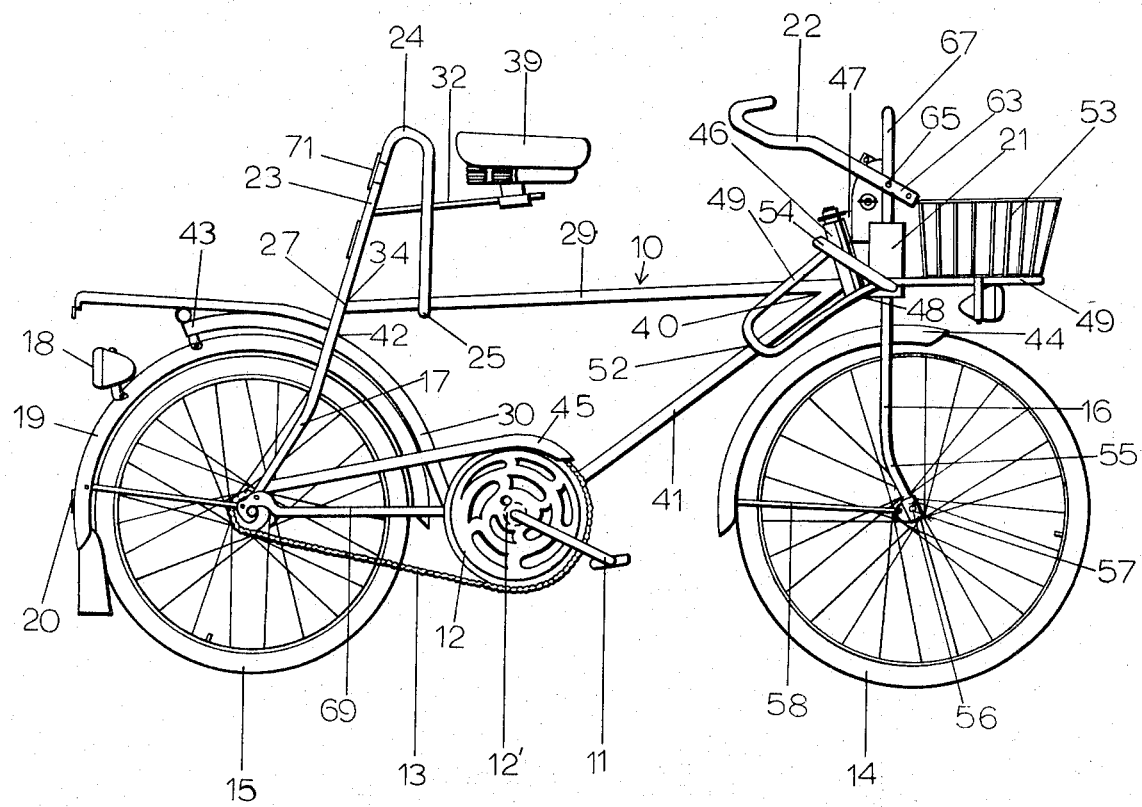
FIG. 1 is a side view of the bicycle according to the invention.
Figure 2:
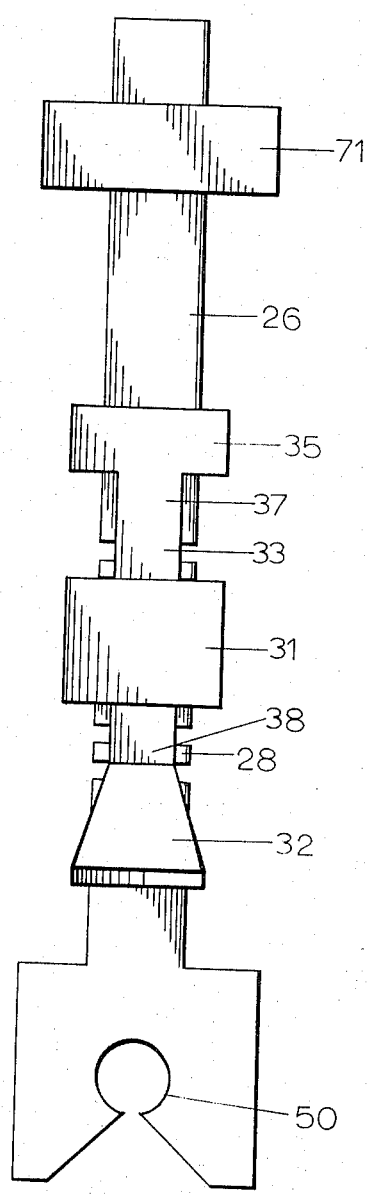
FIG. 2 is a front view of the seat support mechanism according to the invention.
Figure 3:
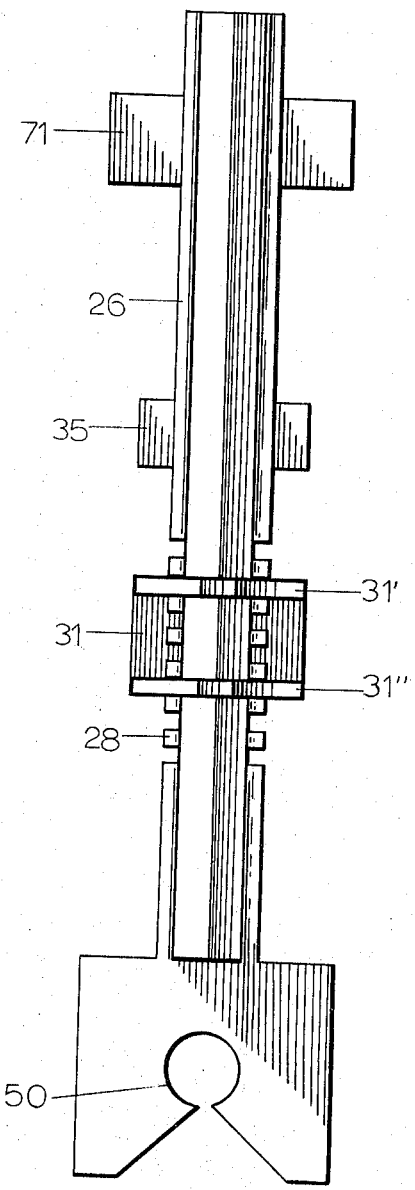
FIG. 3 is a rear view of the seat support mechanism.
Figure 8:
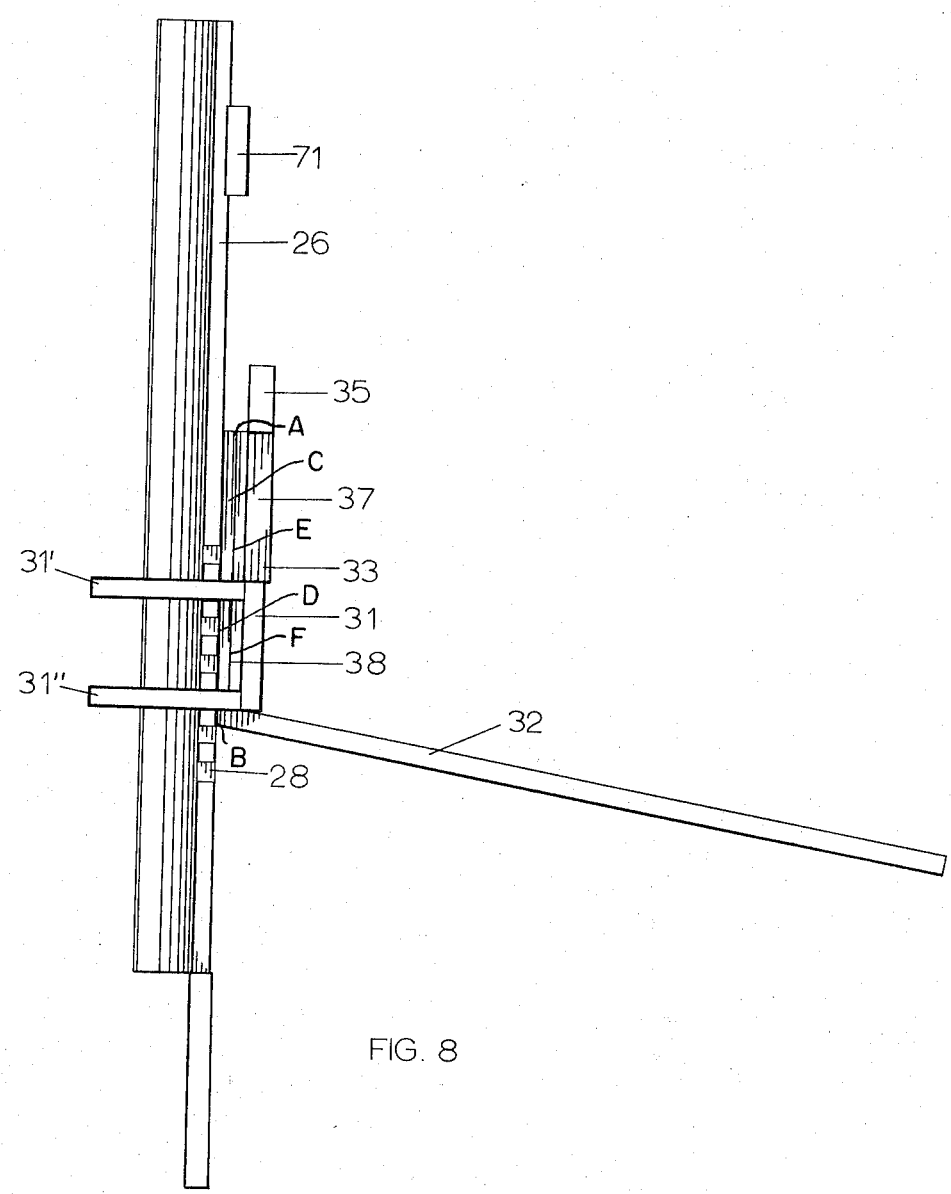
FIG. 8 is a side view of the seat support mechanism in the released position for adjustment of height according to the invention.

Now with more particular reference to the drawings, the bicycle shown has a frame 10 that is made up of rigid bars generally of a conventional type. Frame 10 has front fork 16, rear fork 17, drive mechanism 12 and seat support 23.

The front fork 16 has a lower end 55 with threaded hole 56 and hub receiving slot 57. Front fender brace 58 is attached to lower end 55. Front fork 16 consists of two vertical posts which support the front wheel 14 and extend separately upwardly through a fifth wheel 21.

Fifth wheel 21 is attached to front post 46 by top bridge 47 and bottom bridge 48. Handle bars 22 consist of a single tube bent such that they may be flipped over for a different style handle bar. The handle bars may also be adjusted upwardly, downwardly or tiltably.

The ends 63 of handle bar 22 are attached by eye bolts 65 to the outer sides of upper front fork extension 67. Front basket support 49 prescribes a U-turn and is attached to lower front frame 41 at weld 52. Basket support 49 proceeds upwardly and forwardly past front post 46 and fifth wheel 21 and underneath basket 53. Basket support 49 is connected at three points to cross support members 54. The basket support 49 also forms a cage which limits the travel of front fork 16 as a safety feature in the event of a spill. The front fork 16 also supports front fender 44.

Rear fork 17 is made up of one continuous piece which supports the rear wheel 15. Rear fork 17 extends upwardly above the frame 10 in two generally parallel spaced truss portions 23 which curve downwardly at 24 in an inverted U-shape and come together at 25. Frame 10 also has two horizontally spaced members 69 which run from the lower end of rear fork 17 to the sprocket housing at 12'. Members 69 are attached to housing 12' on either side of rear lower frame member 30. Frame 10 also has an upper generally horizontal cross bar 29 which joins column 26 at weld 34. The rear forks 17 join column 26 at weld 27. Horizontal cross bar 29 joins the lower front frame member 41 at weld 40. The lower front frame member 41 runs generally downwardly and rearwardly with reference to the bicycle and joins lower rear frame member 30 at sprocket housing 12'.

The drive mechanism 12 is of a conventional type having the crank 11 supported at the bottom with the usual sprocket 12 and chain 13 and chain guard 45. Lower rear frame member 30 runs from sprocket 12 generally upwardly and rearwardly with reference to the bicycle, passes through rear fork 17 at intersection 42 and continues generally rearwardly to end 43. Lower rear frame member 30 and lower front frame member 41 are one continuous piece, never completely severed at any of its intersections. Lower rear frame member 30 supports the rear fender 19 with lights 18 and reflector 20.

The flat or slightly oval resilient column 26 is welded to the frame 10 between the rear fork members 17 at the welded end 34 of cross bar 29. The lower rear frame member 30 is attached to column 26. Opening 50 in column 26 receives frame member 30. The column 26 is attached to both seat support members 23, the upper portions of rear fork members 17, by cross member 71 which acts as a stopper for slider 31. The column 26 has spaced notches 28 defined by projections in each side. Supported over the notches 28 is the slider 31 which restrains the seat support bar 32 in relation to the column 26. The seat support bar 32 has a vertical column 33 which is generally parallel to column 26. Vertical column 33 has an laterally extending upper end 35 which will not pass through hole 36 in slider loop 31' or 31".

The seat support is made up of a seat support bar 32 having a vertical portion 38 integrally attached to it with a thickened section 37 attached to it with a T-shaped upper end 35.

When the seat is in use position, as shown in full lines in FIG. 4, the notches 28 are moved out of registration with notches 34' in the slider 31, and the thickened section 37 is moved down into the slider holding one notch 28 under a detent 34 on the slider.

When it is desired to adjust the seat bar 32 up and down, the seat bar is moved up to the dashed line position 32'. This allows the slider 31 to be moved back under the thickened section 37 thus bringing the notches 28 into registration with the notches 34' in the slider. The slider and seat support can then be moved up or down. When the seat support 32 is in the desired position, the slider will then be moved forward bringing the detent 34 into a notch 28. The seat support bar can then be slid down until the upper T-shaped end 35 engages the top of the slider 31. The thickened section 37 will then be in the slider in the position shown in FIG. 4. The slider can then be moved forward to bring the detent 34 into the desired notch 28. The thickened section 37 can then move down along with the seat bar until the T-shaped bar 37 engages the top of the slider. The thickened section will then hold the slider in position and prevent the notches from moving away from the detent 34.

The foregoing specification sets forth the invention in its preferred practical forms but the structure shown is capable of modifcation within a range of equivalents without departing from the invention which is to be understood is broadly novel as is commensurate with the appended claims.

The embodiments of the invention in which an exclusive property or privilege is claimed are defined as follows:

1. A bicycle seat support adapted to be supported on a bicycle comprising
  a column,
  said column comprising an elongated column member adapted to be attached at its bottom to a bicycle frame and having spaced notches in at least one side,
  an elongated seat support bar having a generally vertical part and a generally horizontal part,
  a slider loop having upper and lower loop portions spaced from each other,
  said seat support bar having said vertical part received in both said upper and said lower loop portions and disposed between said slider loop and said column,
  detent means on said slider loop adapted to engage said notches in said column,
  said seat support bar having means thereon for supporting a bicycle seat.

2. The seat support recited in claim 1 wherein said bar is made of a resilient material.

3. The seat support recited in claim 1 wherein said vertically extending member is in the form of a bar flat on at least one side and said notches being vertically spaced on said bar.

4. The seat support recited in claim 1 wherein said loop portions of said slider loop have generally rectangular openings therein,
  and said detent means are disposed at the corners of said slider loop spaced loop portions.

5. The seat support recited in claim 1 wherein said seat support bar has a head thereon and loops in said bar extend through said slider loop adjacent said column,
  and said seat support bar vertical part is bent at approximately 90° to said horizontal part and said horizontal part supports said seat in cantilever fashion on the end opposite said column and is received in said slider loop.

6. The seat support recited in claim 1 wherein said seat support bar comprises a flat platelike member having a head on one end,
  said head engaging the lower side of said slider loop,
  and said vertical part of said platelike member has a head.

7. In combination, a bicycle and a bicycle seat support comprising
  a column,
  said column comprising an elongated column member adapted to be attached at its bottom to a bicycle frame and spaced notches formed in at least one side of said column,
  an elongated seat support bar,
  a loop comprising vertically spaced loop portions,
  said column and said seat support bar extending through said loop portions,
  and said seat support bar and said column resting against each other,
  detent means on said loop adapted to engage said notches in said column,
  said seat support bar having means thereon for supporting a bicycle seat.

8. The combination recited in claim 7 wherein said seat support bar is made of a resilient material.

9. The combination recited in claim 7 wherein said vertically extending member is in the form of a bar flat on at least one side and said notches are vertically spaced on said bar.

10. The combination recited in claim 7 wherein said loop portions have generally rectangular openings therein,
  and said detent means are disposed at the corners of said loop.

11. The combination recited in claim 7 wherein said seat support bar has a head on one end and is disposed adjacent said loop and said bar supports said seat in cantilever fashion on the end opposite said column and is received in said loop.

12. The combination recited in claim 7 wherein said seat support bar comprises a flat platelike member having a head on one end,
  said head engaging the lower side of one said loop portion,
  and said platelike member being bent at approximately 90°.

13. The combination recited in claim 7 wherein said bicycle has a rear fork, upwardly extending ends extending upward from said rear fork, said column extending upwardly between said ends.

14. The combination recited in claim 13 wherein said ends of said rear fork are bent back on themselves in U-shape and their lower ends are fixed to said frame.

* * * * *